US008484495B2

(12) United States Patent
Boyd et al.

(10) Patent No.: US 8,484,495 B2
(45) Date of Patent: Jul. 9, 2013

(54) POWER MANAGEMENT IN A MULTI-PROCESSOR COMPUTER SYSTEM

(75) Inventors: William T. Boyd, Poughkeepsie, NY (US); Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/731,505

(22) Filed: Mar. 25, 2010

(65) Prior Publication Data

US 2011/0239016 A1 Sep. 29, 2011

(51) Int. Cl.
*G06F 1/32* (2006.01)
(52) U.S. Cl.
USPC ............................... 713/320; 718/102
(58) Field of Classification Search
USPC ............................... 713/320; 718/102
See application file for complete search history.

(56) References Cited

U.S. PATENT DOCUMENTS

| | | | |
|---|---|---|---|
| 5,142,684 | A | 8/1992 | Perry et al. |
| 7,093,147 | B2 | 8/2006 | Farkas et al. |
| 7,249,268 | B2 | 7/2007 | Bhandarkar |
| 7,308,591 | B2 | 12/2007 | Dubinsky |
| 7,526,661 | B2 | 4/2009 | Nakajima et al. |
| 8,112,648 | B2 * | 2/2012 | Branover et al. ............. 713/320 |
| 8,381,215 | B2 * | 2/2013 | Johnson et al. ............... 718/102 |
| 2005/0132239 | A1 | 6/2005 | Athas et al. |
| 2006/0123251 | A1 | 6/2006 | Nakajima et al. |
| 2006/0149985 | A1 | 7/2006 | Dubinsky |
| 2007/0079150 | A1 | 4/2007 | Belmont et al. |
| 2008/0184044 | A1 | 7/2008 | Leech et al. |

FOREIGN PATENT DOCUMENTS

| | | |
|---|---|---|
| EP | 1351117 A1 | 10/2003 |
| WO | WO0239242 | 5/2002 |

OTHER PUBLICATIONS

B. Lubin et al.; Expressive Power-Based Resource Allocation for Data Centers—"IJCAI '09 Proceedings of the 21st International Joint Conferences on Artificial Intelligence" 2009; pp. 1451-145; XP002623108.
K. Meng et al.; "Multi-Optimization Power Management for Chip Multiprocessors" Proceedings of the 17th International Conference; Oct. 25, 2008; pp. 177-186.
PCT/EP2010/067026—Written Opinion—Apr. 8, 2011.
PCT/EP2010/067026—PCT Search Report—Dated Apr. 8, 2011.
PCT/EP2010.067044 PCT Search Report—Dated Mar. 25, 2010.
PCT/EP2010/067044—PCT Written Opinion—Mar. 25, 2010.
Steinder M. et al.; "Coordinated Management of Power Usage and Runtime Performance"; Network Operations and Management Symposium 2008; Apr. 7, 2008.

* cited by examiner

*Primary Examiner* — Albert Wang
(74) *Attorney, Agent, or Firm* — Cantor Colburn LLP; John Campbell

(57) ABSTRACT

Power management in a multi-processor computer system, including a computer program product for facilitating receiving a task for execution in a high power state, and determining a current power state of a processor in a multi-processor system, the system having a specified power limit. The task is dispatched to the processor if the current power state of the processor is the high power state. If the processor is not in the high power state, then it is determined if moving the processor into the high power state will cause the multi-processor system to exceed the specified power limit. The processor is moved into the high power state in response to determining that moving the processor into the high power state will not cause the multi-processor system to exceed the specified power limit. The task is dispatched to the processor in response to moving the processor into the high power state.

25 Claims, 7 Drawing Sheets

POWER MANAGEMENT IN A MULTI-PROCESSOR COMPUTER SYSTEM

BACKGROUND

This invention relates generally to processing within a computing environment, and more particularly to power management in a multi-processor computer system.

Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the interconnect interface(s).

Extensive research and development efforts are invested by the industry, on an ongoing basis, to create improved and/or innovative solutions to maximize overall computer system performance and density by improving the system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the computer system design challenges, and include such items as ease of upgrade and reduced system environmental impact (such as space, power, and cooling).

As the performance of processors continues to increase, the amount of power consumed by the processors is also likely to continue to increase. The amount of power that can be consumed by a given processor is often limited by a variety of factors such as the operating environment of the processor. Thus, improvements in processor performance may be gated by the additional power required by the processor to implement the improvements.

BRIEF SUMMARY

An exemplary embodiment is a computer program product for dispatching a task in a computer system. The computer program product includes a tangible storage medium readable by a processing circuit and storing instructions for execution by the processing circuit for performing a method. The method includes receiving a task for execution in a high power state, and determining a current power state of a processor. The processor is one a plurality of processors in a multi-processor system and the multi-processor system has a specified power limit. The task is dispatched to the processor in response to determining that the current power state of the processor is the high power state. In response to determining that the current power state of the processor is not the high power state, it is determined if moving the processor into the high power state will cause the multi-processor system to exceed the specified power limit. The determining is responsive to the specified power limit and to current power states of the plurality of processors in the multi-processor system. The processor is moved into the high power state in response to determining that moving the processor into the high power state will not cause the multi-processor system to exceed the specified power limit. The task is dispatched to the processor in response to moving the processor into the high power state.

Another exemplary is a system for dispatching a task in a computer system. The system includes a computer memory and a processor in communication with the computer memory. The processor includes an instruction fetching element for fetching instructions from memory and one or more execution elements for executing fetched instructions. The computer system is configured to perform a method that includes receiving a task for execution in a high power state, and determining a current power state of a processor. The processor is one of a plurality of processors in a multi-processor system and the multi-processor system has a specified power limit. The task is dispatched to the processor in response to determining that the current power state of the processor is the high power state. In response to determining that the current power state of the processor is not the high power state, it is determined if moving the processor into the high power state will cause the multi-processor system to exceed the specified power limit. The determining is responsive to the specified power limit and to current power states of the plurality of processors in the multi-processor system. The processor is moved into the high power state in response to determining that moving the processor into the high power state will not cause the multi-processor system to exceed the specified power limit. The task is dispatched to the processor in response to moving the processor into the high power state.

A further exemplary embodiment is a computer implemented method for dispatching a task in a computer system. The method includes receiving a task for execution in a high power state, and determining a current power state of a processor. The processor is one a plurality of processors in a multi-processor system and the multi-processor system has a specified power limit. The task is dispatched to the processor in response to determining that the current power state of the processor is the high power state. In response to determining that the current power state of the processor is not the high power state, it is determined if moving the processor into the high power state will cause the multi-processor system to exceed the specified power limit. The determining is responsive to the specified power limit and to current power states of the plurality of processors in the multi-processor system. The processor is moved into the high power state in response to determining that moving the processor into the high power state will not cause the multi-processor system to exceed the specified power limit. The task is dispatched to the processor in response to moving the processor into the high power state.

A further exemplary embodiment is a computer program product for dispatching a task in a computer system. The computer program product includes a tangible storage medium readable by a processing circuit and storing instructions for execution by the processing circuit for performing a method. The method includes receiving a task for execution in a low power state, and determining a current power state of a processor. The processor is one a plurality of processors in a multi-processor system and the multi-processor system has a specified power limit. The task is dispatched to the processor in response to determining that the current power state of the processor is the low power state. In response to determining that the current power state of the processor is not the low power state, the processor is moved into the low power state and the task is dispatched to the processor in response to moving the processor into the low power state.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
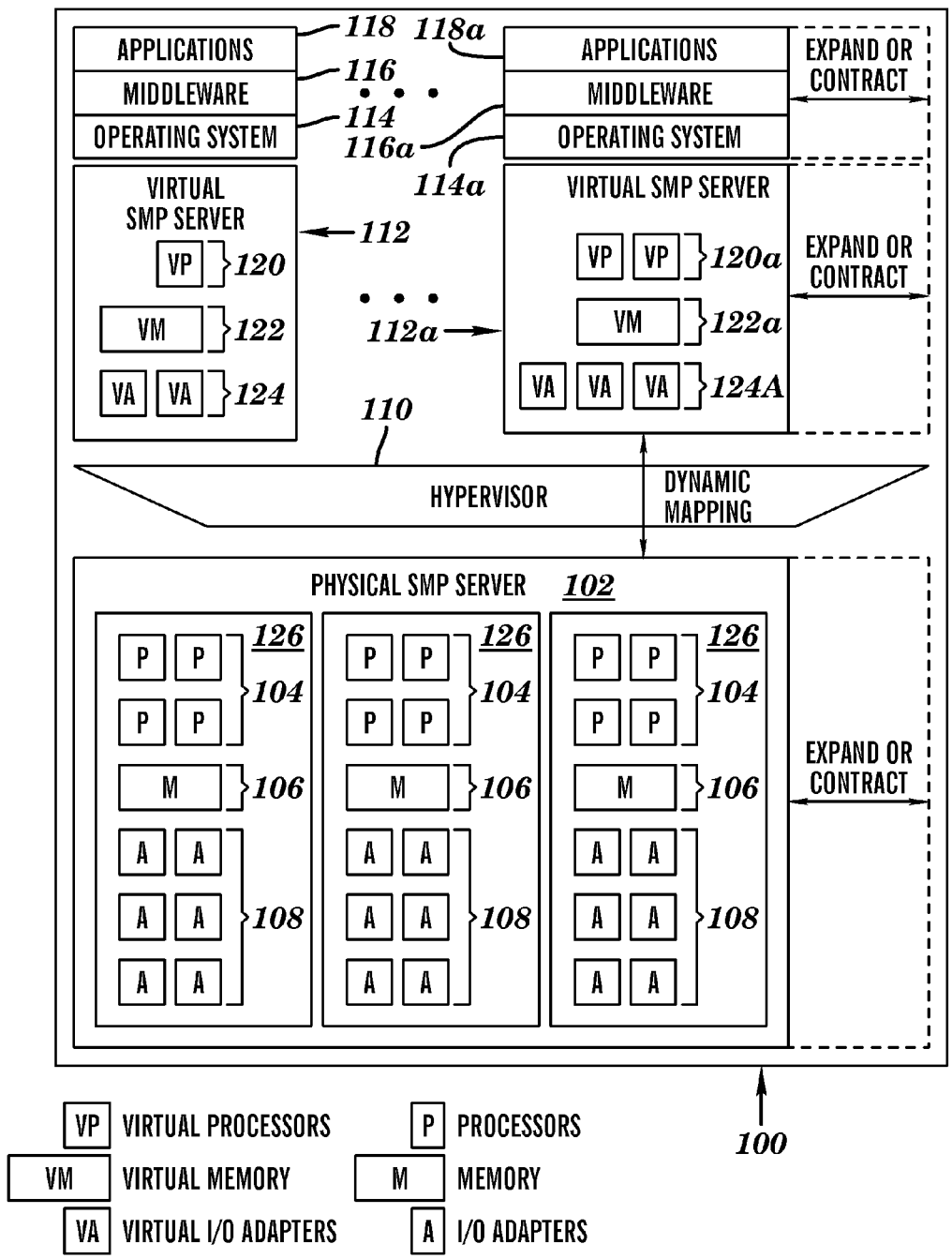
FIG. 1 depicts a block diagram of a data processing system that may be implemented by an exemplary embodiment.

An exemplary embodiment of the present invention provides the ability to optimize power performance when dispatching tasks in a computer system having multiple processors (i.e., a "multi-processor system"). In an exemplary embodiment, the multiple processors may have different performance points (e.g., support different power levels). In an exemplary embodiment, the dispatching algorithm takes advantage of the performance differences between the processors when dispatching tasks in the multi-processor system.

In an exemplary embodiment, the optimizing is based on a current power performance state (real time collection) of each of the processors in the multi-processor system and a power limit within the multi-processor system. In an exemplary embodiment, each of the processors has a maximum power flag indicating if the processor is currently in a high power state. The maximum power flag may also indicate if the processor is capable of being moved into a high power state. In addition, each multi-processor system includes a register for storing a number that indicates how many processors in the multi-processor system can be at a maximum power state at the same time (the power limit). In an exemplary embodiment, the multi-processor system also includes a central power control module that sets/tracks the current power levels of the processors.

An exemplary embodiment of the present invention provides for power/performance optimization of a multi-processor system by optimizing power usage across a multi-processor system. As used herein, the term "power/performance" refers to a measurement of the efficiency of power consumption (e.g., electrical power consumption) in a computer system such as a multi-processor system or in a single processor.

Optimizing a large multiprocessor system for peak performance per Watt is often difficult with contemporary software and hardware. Systems may include multiple processing elements that have a variety of power/performance operating points (also referred to herein as "power states") packaged together in a single package or connected via cache coherent links among multiple packages. Current dispatching algorithms are used to dispatch processes to processing elements based upon the goal of achieving peak performance. Some contemporary systems are subject to severe limitations on the highest possible power dissipation allowed by the room environment where they are housed.

Current multi-processor computing systems may not always provide the best throughput for a given amount of power. Some contemporary computing systems use a single microprocessor core design and use dynamic voltage scaling to change the performance per Watt during various time periods while executing applications. Other contemporary systems include multiple cores with differing instruction set architectures to provide a performance advantage for certain applications. These systems have not been optimized to provide the best throughput per Watt while executing binary compatible application code across many microprocessor cores (cores are also referred to herein as "processors"). One reason is that the dispatcher does not take advantage of the performance differences between cores in a system and does not optimize their utilization.

Exemplary embodiments of the present invention work to optimize the overall power-performance of the system while running a variety of workloads. In an exemplary embodiment, multiple multi-processor systems are used together to provide a computing system that optimizes the total system throughput per Watt. Exemplary embodiments include a multi-processor system made up of processors that span two or more chips (also referred to herein as "integrated circuits" or "microprocessor chips"). These chips are of different types and are able to execute the same binary software but differ in their performance per Watt characteristics. Computing system architectures such as the Intel® IA-32 (Intel Architecture, 32-bit) architecture, and the IBM® Power Architecture® are used for a very wide variety of computing systems. There are many binary compatible processing core designs already available for each of these architectures. Each of these core designs has different power/performance characteristics. Exemplary embodiments will allow better overall power/performance when running multiple processes on a single multi-processor server. By using multiple chips with varying performance and power optimizations, the system throughput per Watt can be increased. Contemporary microprocessor offerings indicate a range of up to 2× performance at the cost of up to 4.5-5× power/performance. This range can be expanded further with additional silicon tuning, device tuning, and circuit choices. Given the opportunity to use multiple multi-processor chips and multiple power performance points of the chips, exemplary embodiments optimize the dispatching of threads to cores in order to maximize the power/performance capability of the system.

In an exemplary embodiment, multiple chips are connected via interconnect busses, potentially through a node controller. A subset of the chips are implemented with a silicon process that has been optimized for high speed at the cost of high power while the majority of chips are implemented with a silicon process optimized for power; both of these chip types are capable of running identical binaries. An exemplary embodiment combines these heterogeneous processors into a symmetric multi-processing (SMP) system with dispatching algorithms tailored to optimize the power/performance. If the service-level agreement (SLA) requirements (or other system requirements) of the processes can be met without the use of the high-performance, high-power processor, then power gating controls provided by exemplary embodiments are used to minimize both active and leakage power of the processor.

When required, a high-performance, high-power core is powered on through the power gating controls and high priority processes are dispatched to this processor (which is in a high power state). In an exemplary embodiment this is accomplished via a novel hypervisor or operating system software that uses SLAs and/or a table of the current state of the multi-processor system that includes a mapping of which cores are high-performance versus power-optimized and which cores are currently powered on. In an optimal power/performance case, all high-powered cores are powered off and they are powered on only as required to meet the SLAs (or other system requirements).

As an example, on a power-optimized core, a thread finishes its current timeslice, indicated by timer interrupt, and the dispatcher is invoked. The dispatcher code includes a periodic check of the quality of service, or current service level. In this example it is determined that a potential quality of service issue has arisen. This information is used to determine which thread should be the next thread to be dispatched. It may be determined that a high-performance core should be used. The dispatcher determines whether enough high-performance hardware cores are available (and powered on) for the combination of the currently running threads and this new thread that has hit a potential quality of service problem. In some cases, the dispatcher signals the system control code that a high-performance core should be powered on in order to increase the hardware available to meet the SLAs of all the threads in the system. The dispatcher may choose another waiting thread if available. In an exemplary embodiment, this thread would be the highest priority among those threads that are currently meeting their quality of service level. In an alternate exemplary embodiment, currently running low priority threads may be interrupted on a number of cores in order to free up enough thermal overhead to enable the system to turn on the additional high powered core.

An exemplary embodiment uses a set of software tables controlled by the hypervisor or operating system that include an indication of which threads are waiting to be dispatched on high-power/high-performance cores. Other information may include the current status of all of the cores in the system; specifically, which cores are high-performance and their location, and which cores are currently powered on. The resulting system will have a varying number of hardware threads available to the dispatcher; this number of threads will by dynamically changed by the hypervisor and/or operating system in order to meet the SLA requirements.

FIG. 1 is a block diagram of a data processing system 100 in which an exemplary embodiment of the present invention may be implemented. In an exemplary embodiment, system 100 is a SMP server computer system. The SMP server computer system 100 depicted in FIG. 1 includes physical hardware devices that can be mapped to, i.e. temporarily owned by, a user application to execute that application.

SMP server computer system 100 includes a physical SMP server 102 that includes physical hardware devices such as processors 104, memory 106, and I/O adapters 108. These physical devices are managed by a hypervisor 110 that resides on the physical SMP server computer system 100. As depicted in FIG. 1, the physical SMP server 102 is implemented by one or more microprocessor chips 126. Though shown in FIG. 1 as having similar configurations, the microprocessor chips 126 within the physical SMP server may have different configurations (e.g., different number of processors 104).

As used herein, the term "microprocessor chip" 126 refers to a device that is fabricated using a single piece of silicon. The microprocessor chip 126 may also be called a chip or an integrated circuit. One or more hardware elements are fabricated on the single microprocessor chip. The hardware elements generally include processors 104 (or processing cores), memories 106 (e.g., cache memories), I/O adapters 108, but may also include special functional elements such as compression engines, encryption engines, protocol processing engines, architecture emulation engines, and data stream processing engines.

A virtual server is a proxy for a physical server that has the same capabilities, interfaces, and state. Virtual servers are created and managed by the hypervisor 100 and each virtual server appears to be a physical SMP server to its user (e.g., an operating system, middleware, and application software that run on it). The SMP server computer system 100 depicted in FIG. 1 includes one or more virtual servers such as virtual server 112 and virtual server 112a. Each virtual server 112 appears to its software to include its own processor(s), memory, and I/O adapter(s) that are available for the exclusive use of that virtual server 112. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server 112 supports its own software environment, including an operating system, middleware, and applications. The software environment of each virtual server 112 can be different from the software environment of other virtual servers. In an exemplary embodiment, the operating systems executed by each virtual server may differ from one another. For example, virtual server 112 supports operating system 114, middleware 116, and applications 118. Virtual server 112 a supports operating system 114a, middleware 116a, and applications 118a. Operating systems 114 and 114a may be the same or different operating systems.

A virtual server 112 is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. The hypervisor 110 manages the selections of physical devices and their temporary assignment to virtual devices.

The hypervisor 110 is responsible for dynamically creating, managing, and destroying virtual SMP servers. Whole virtual processors, virtual I/O adapters, and virtual memory blocks can be removed or added by hypervisor 110. The hypervisor 110 is also responsible for dynamic resource allocation, managing time-sharing of physical resources, and altering the physical resource mapped to a processor without involving the operating system. The hypervisor 110 is also able to dedicate physical resources to virtual resources for situations where sharing is not desired. The hypervisor 110 is responsible for managing the addition or removal of physical resources. The hypervisor 110 makes these additions and deletions transparent to the upper level applications.

The terms "processing core" and "processor" are used interchangeably herein to refer to the same device. As used herein, the term "physical processor" refers to a processing core and may include other hardware elements that are either dedicated to that core or shared by multiple cores. Thus, a physical processor is a processing core and hardware elements that are either dedicated to or shared by that processing core.

As used herein, the term "current power state" refers to the current power state of a processor. In an exemplary embodiment the current power state is a high power state or a low power state. As used herein, the term "high power state" refers to a processing core that has been placed in a high clock frequency mode. As used herein the term "high power core" refers to a processing core that is executing in a high power state. As used herein, the term "low power state" refers to a processing core that has been placed in a low clock frequency mode. In general, the low power state is a power efficient state. An exemplary embodiment uses changes in the core clock frequency as the means to adjust the power/performance of the various processing cores in the system. It should be understood that any other methods of adjusting the power/performance of the core may be used instead of, or in addition to, this clock frequency control. Adjustments of the power/performance of the core are referred to herein as "moving" the processor into a particular power state. Moving the processor from a low power state into a high power state includes altering the operating frequency setting in the clock control logic to a higher frequency setting. Any suitable clock control mechanism may be used. Exemplary embodiment utilize two settings: high (e.g., 4 GHz) and low (e.g., 3 GHz). Alternate embodiments include several possible frequency settings and additional logic to determine the number of steps to be increased on the frequency scale. Similarly, moving the processor from a high power state into a low power state includes altering the operating frequency setting in the clock control logic to a lower frequency setting.

Figure 2:
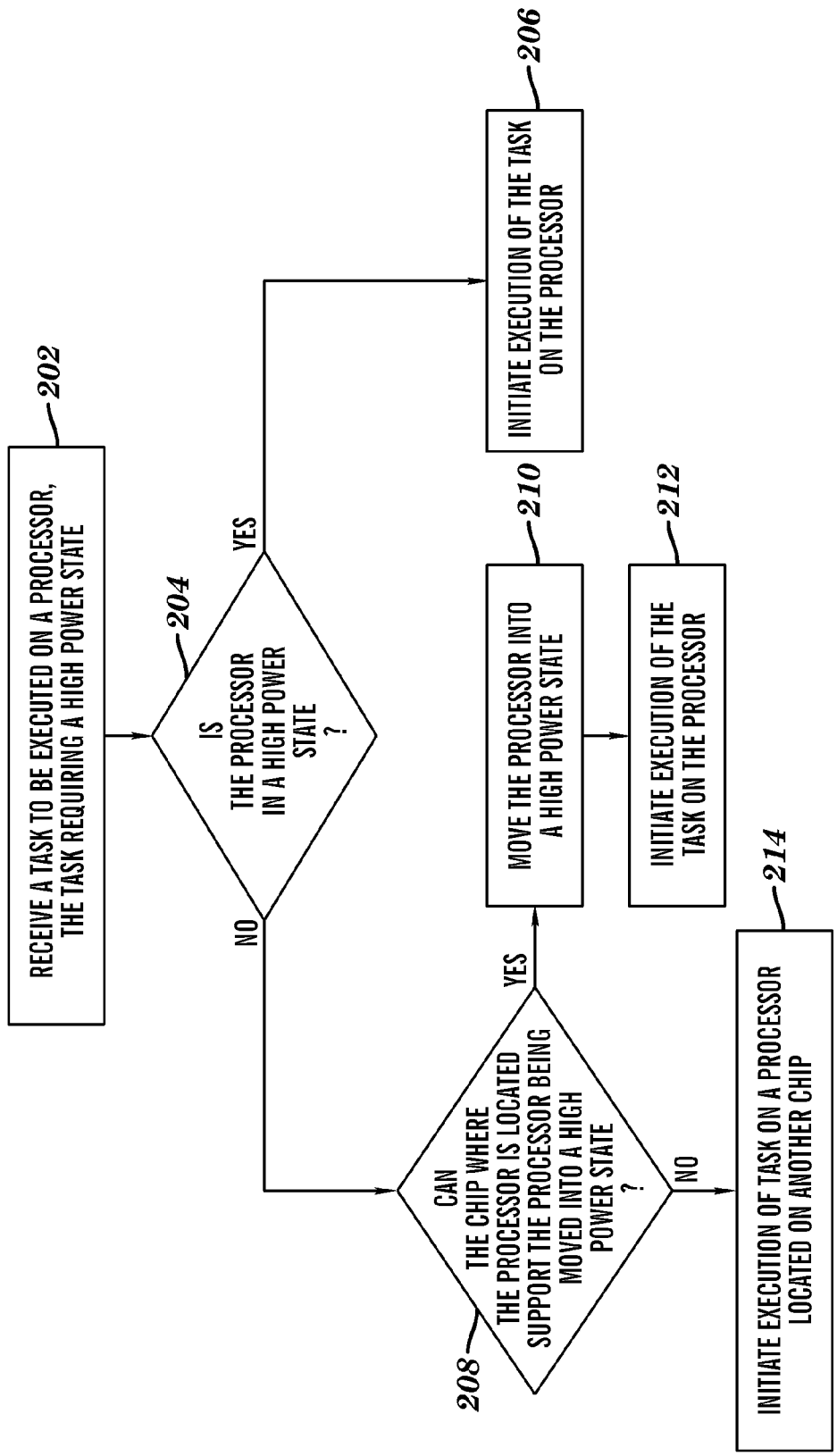
FIG. 2 depicts a process flow of a dispatch algorithm that may be implemented by an exemplary embodiment.

FIG. 2 depicts a process flow of a dispatch algorithm that may be implemented by an exemplary embodiment. In an exemplary embodiment, the algorithm is executed by the hypervisor 110 which is responsible for implementing the virtual servers in a data processing system, including managing the time-sharing of physical processors among many different virtual processors. In an exemplary embodiment, the dispatch algorithm in the hypervisor 110 initiates the execution of the tasks.

At block 202, a task to be executed on a processor is received. The task is a high power state task that requires execution on a processor that is in a high power state. As used herein, the term "task" refers to a thread, or a group of threads. At block 204, it is determined if the processor is in a high power state. If the processor is in a high power state, then block 206 is performed to initiate execution of the task on the processor. If the processor is not in a high power state, then block 208 is performed to determine if the chip, or multi-processor system, where the processor is located can support the processor being moved into a high power state. If the multi-processor system can support the processor being moved into a high power state, then block 210 is performed and the processor is moved into a high power state. In an exemplary embodiment, the dispatch process checks whether the processor is capable of moving into a high power state. Once the processor has been moved into a high power state, block 212 is performed to initiate execution of the task on the processor. If the multi-processor system cannot support the processor being moved into a high power state, then block 214 is performed to initiate execution of the task on a processor that is located on another chip (or in another multi-processor system).

Figure 3:
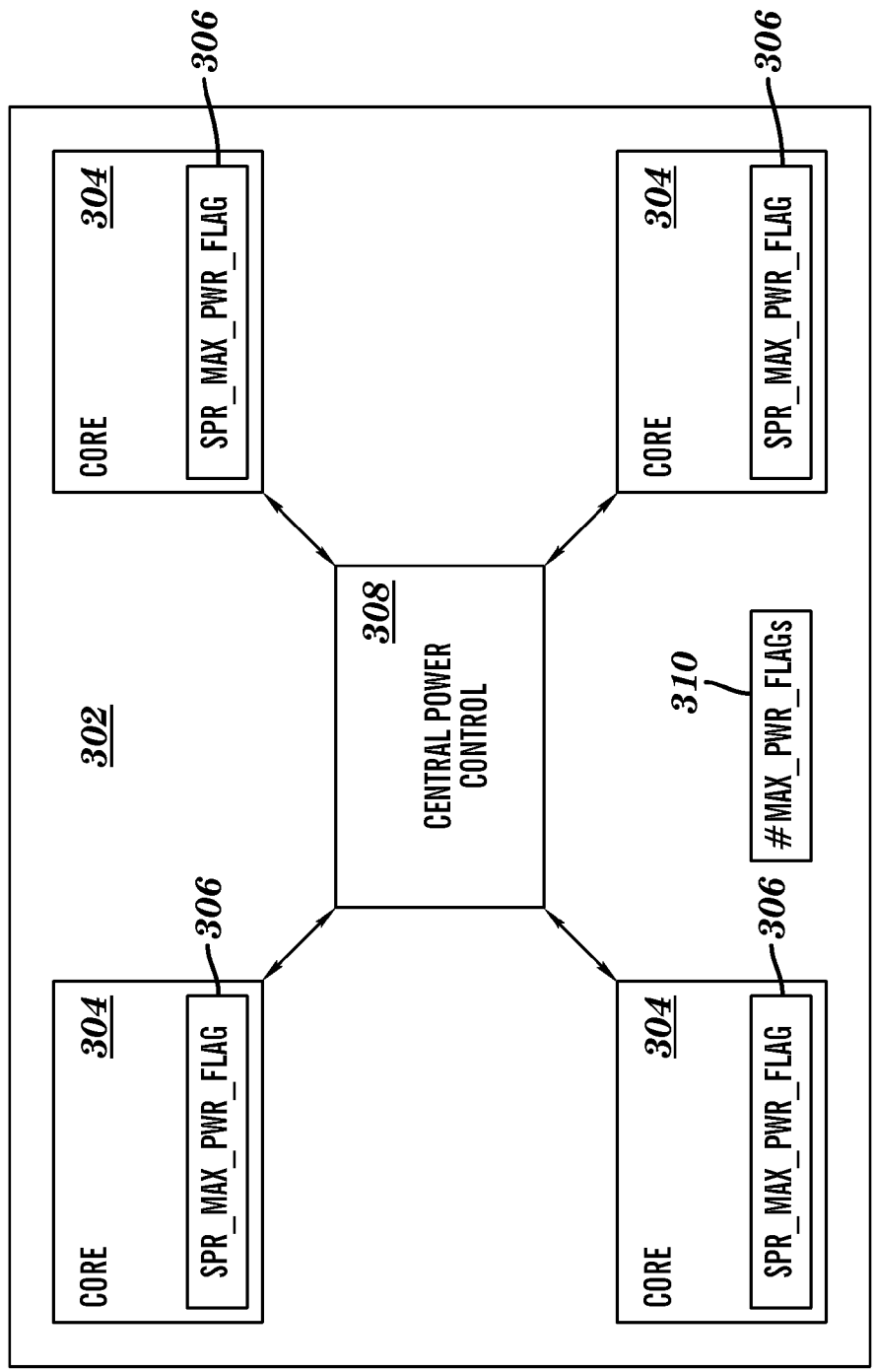
FIG. 3 depicts a block diagram of a multi-processor system that may be implemented by an exemplary embodiment.

FIG. 3 depicts a block diagram of a multi-processor chip 302 that is implemented by a single microprocessor chip (such as microprocessor chip 126) that may be implemented by an exemplary embodiment. The multi-processor chip 302 depicted in FIG. 3 includes a plurality of processors 304, a "#Max_Pwr_Flag" 310, and an optional central power control module 308 in communication with each of the processors 304. The #Max_Pwr_Flag 310 indicates the maximum number of processors 304 located on the multi-processor chip 302 that may be in the high power state at any given time. The #Max_Pwr_Flag 310 may be stored in any manner known in the art for quick retrieval by the dispatch process, such as, but not limited to, a register or memory. Each of the processors 304 depicted in FIG. 3 includes a Spr_Max_Pwr_Flag 306 that indicates whether the processor 304 is in a high power state. In addition, the Spr_Max_Pwr_Flag 306 may indicate whether the processor 304 is capable of moving in to a high power state. In an alternate exemplary embodiment, the capability of each processor 304 to move into a high power state is stored in the central power control module 308 or in another location external to the processor 304 and accessible by the dispatch process. It should be understood that multiple chips 302 can be used together in a large multi-processor system and the hypervisor 110 can coordinate the MAX_PWR FLAGS 310 across the multi-processor system.

In the exemplary embodiment depicted in FIG. 3, a new special purpose register, Spr_Max_Pwr_Flag 306 is utilized to indicate when to allow the highest power settings of the processors 304. A maximum number of processors 304 (as indicated by the #Max_Pwr_Flag 310) are allowed to have their Spr_Max_Pwr_Flag 306 set. In an exemplary embodiment, new dispatch code is provided to monitor estimated power and temperature of the multi-processor system 302 along with special purpose registers in which feedback from the multi-processor operating conditions are kept. These additional special purpose registers can be read by the hypervisor in order to optimize the dispatching algorithm for the overall goal of meeting SLAs while optimizing power consumption.

Though shown in FIG. 3 as being on a single integrated circuit, a multi-processor system may span multiple integrated circuits.

Figure 4:
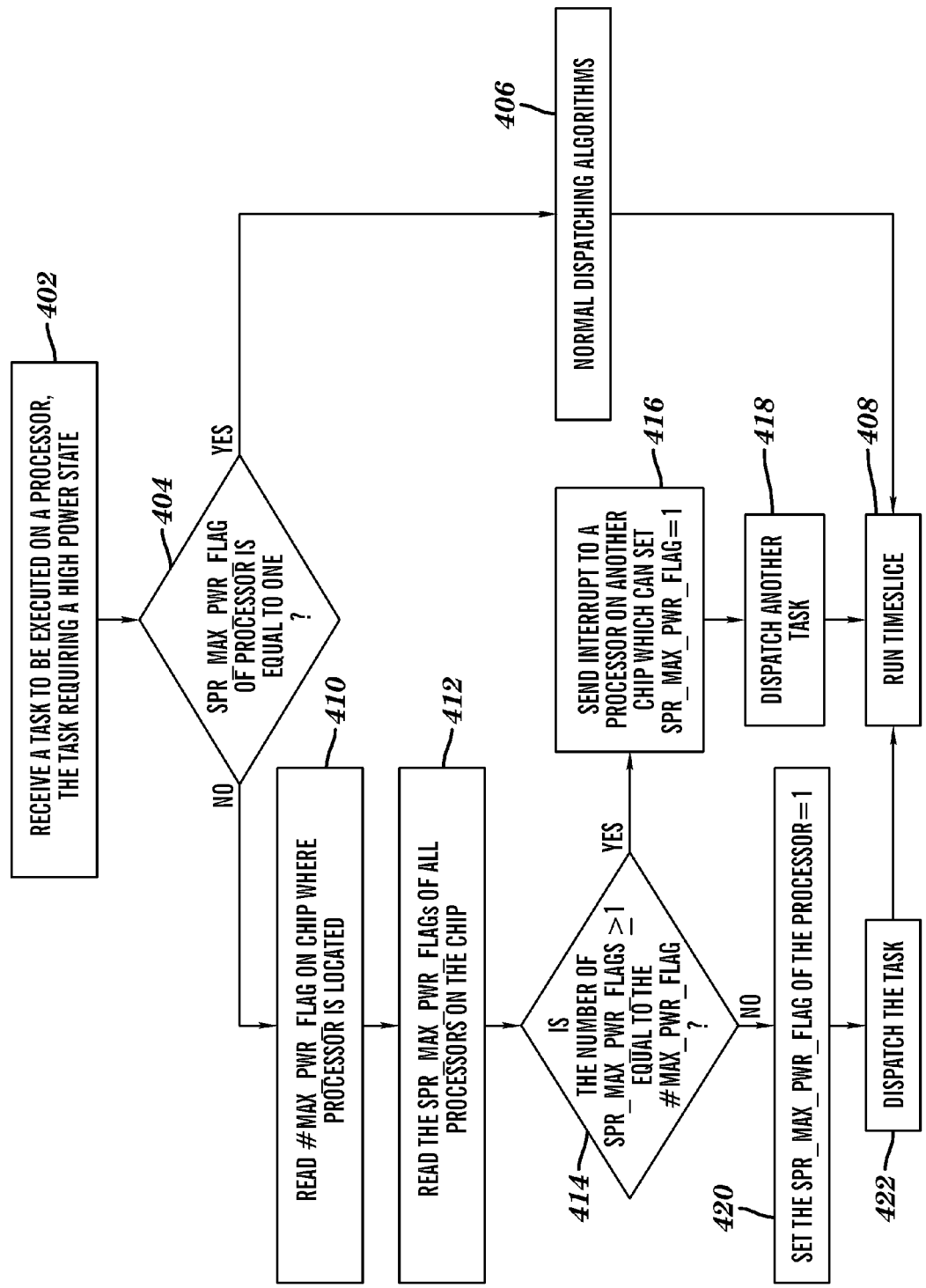
FIG. 4 depicts a process flow of a dispatch algorithm that may be implemented by an exemplary embodiment.

FIG. 4 depicts a process flow of a dispatch algorithm that may be implemented by an exemplary embodiment. In an exemplary embodiment, the algorithm is executed by the hypervisor 110 which is responsible for implementing the virtual servers in a data processing system, including managing the time-sharing of physical processors among many different virtual processors. In an exemplary embodiment, the dispatch algorithm in the hypervisor 110 initiates the execution of the tasks.

At block 402, a task requiring execution on a high power state processor is received. In an exemplary embodiment, the task is identified by the software (e.g., in the hypervisor and/or operating system) that tracks the status of the processes that are in the ready queue. In an exemplary embodiment, the ready queue includes a list of tasks and priorities and a status of how each task is performing relative to a corresponding SLA. In an exemplary embodiment, the tasks that have high priorities and/or are in danger of not meeting an SLA are sent to the dispatch process as tasks that require execution in a high power state.

At block 404, it is determined if the processor is capable of executing in a high power state (as indicated by the Spr_Max_Pwr_Flag 306). If the processor is capable of executing in the high power state, then processing continues at block 406 with normal dispatching algorithms being performed. In this exemplary embodiment, it is assumed that if the processor is capable of executing in a high power state that it is currently executing in the high power state. In an alternate exemplary embodiment, the processor may have to be moved into the high power state prior to executing the task. Processing then continues at block 408 where a timeslice is run to execute the task.

If it is determined at block 404, that the processor is not capable of executing in a high power state, then block 410 is performed. At blocks 410-414, it is determined if the multi-processor system can support having the processor moved into a high power state. At block 410, the current #Max_Pwr_Flags 310 is read to determine the maximum number of processors that can be executing in the high power state (i.e., the specified power limit). At block 412, the current Spr_Max_Pwr_Flags 306 in each of the processors 304 in the multi-processor system 302 are read. In another exemplary embodiment, the Spr_Max_Pwr_Flags 306 are read and stored on a periodic basis. In another exemplary embodiment, the Spr_Max_Pwr_Flags 306 are stored by the hypervisor (as they change) in a common storage area accessible by the dispatcher to avoid having to access each processor in order to determine a current power status. At block 414, the number of processors that are currently capable of moving into a high power state (as indicated by the Spr_Max_Pwr_Flags 306) is compared to the number specified in the #Max_Pwr_Flags 310.

If the number of processors that are currently capable of moving into a high power state is less than the number in the #Max_Pwr_Flags 310, then block 420 is performed. At block 420, the Spr_Max_Pwr_Flag 306 in the processor 304 is set to one. In an exemplary embodiment, this causes the processor 304 to move into a high power state. In an alternate exemplary embodiment, this causes a check to be performed to determine if the processor 304 is capable of executing in a high power state. At block 422, the task is dispatched and processing continues at block 408.

If the number of processors that are currently capable of moving into a high power state is equal to the number in the #Max_Pwr_Flags 310, then block 416 is performed. At block 416, an interrupt is sent to a processor located on another chip or multi-processor system. In an exemplary embodiment, the dispatcher verifies that the other chip can support having the processor moved into a high power state prior to sending the interrupt. Processing then continues at block 418, where another task (e.g., one that does not require a high power state) is dispatched on the processor. Processing then continues tat block 408.

The maximum number of processors that can be capable of executing at a high power state at one time, as stored in the #Max_Pwr_Flags 310, is one example of a specified power limit that may be implemented by an exemplary embodiment.

In an exemplary embodiment, the specified power limit is updated on a periodic basis in response to current environmental conditions (e.g., temperature of the processor, chip and/or room where system is located, power consumption of other system components). In another exemplary embodiment, the specified power limit is updated based on characteristics of other multi-processor systems such as current power, temperature, specified power limits.

Figure 5:
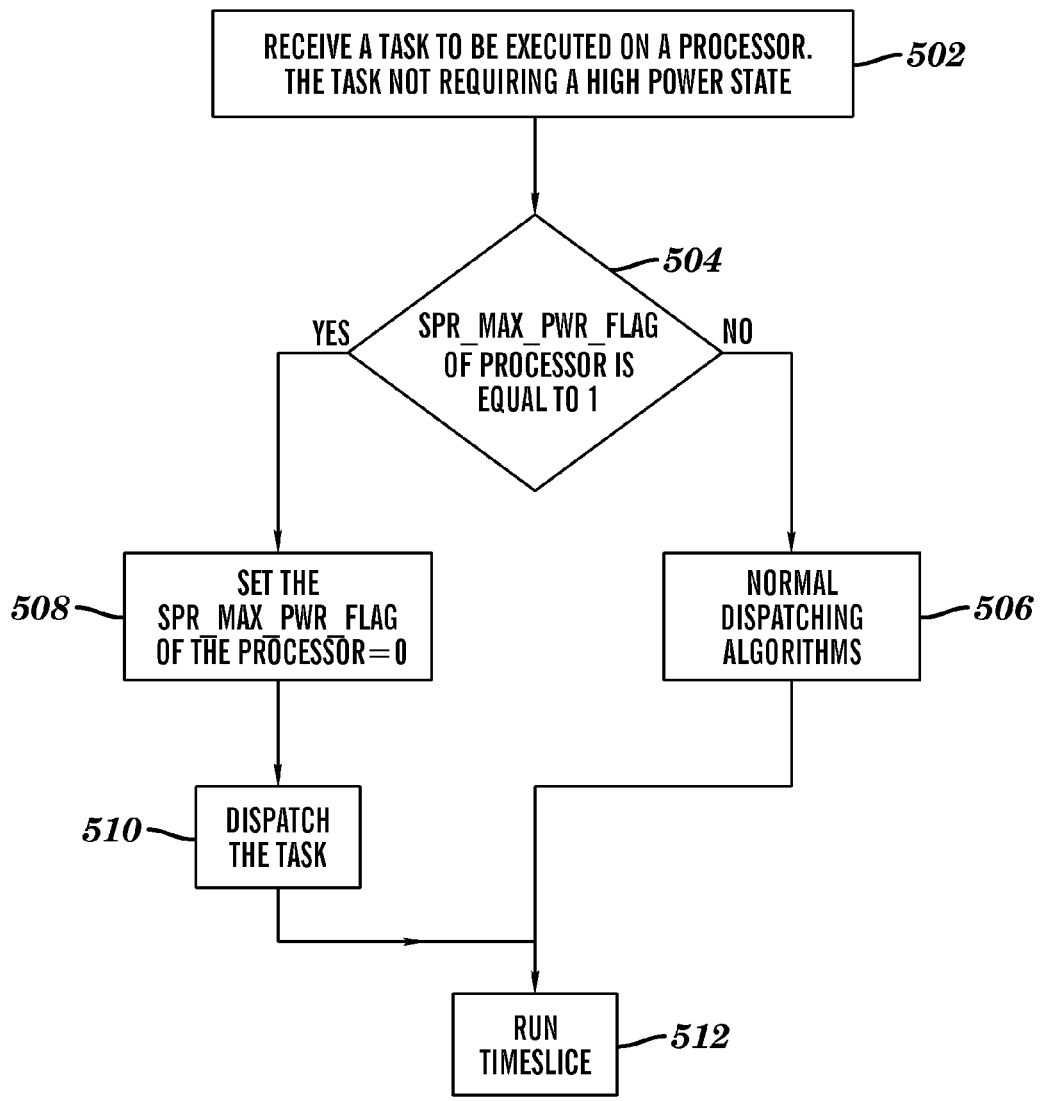
FIG. 5 depicts additional detail of a process flow of a dispatch algorithm that may be implemented by an exemplary embodiment.

FIG. 5 depicts additional detail of a process flow of a dispatch algorithm that may be implemented by an exemplary embodiment. At block 502, a task that does not require the use of a high power processor is received. At block 504, it is determined if the processor is capable of executing in the high power state (as indicated by the SPR_MAX_PWR_FLAG 306). If the processor is not capable of executing in the high power state, then processing continues at block 506 where normal dispatching algorithms are executed, followed by the timeslice being executed at block 512.

If it is determined at block 504, that the processor is capable of executing in the high power state (as indicated by the SPR_MAX_PWR_FLAG 306), then processing continues at block 508 where the SPR_MAX_PWR_FLAG 306 is set to 0 (into a low power state) as a high power state is not required. The task is then dispatched in block 510, followed by the timeslice being executed at block 512.

Figure 6:
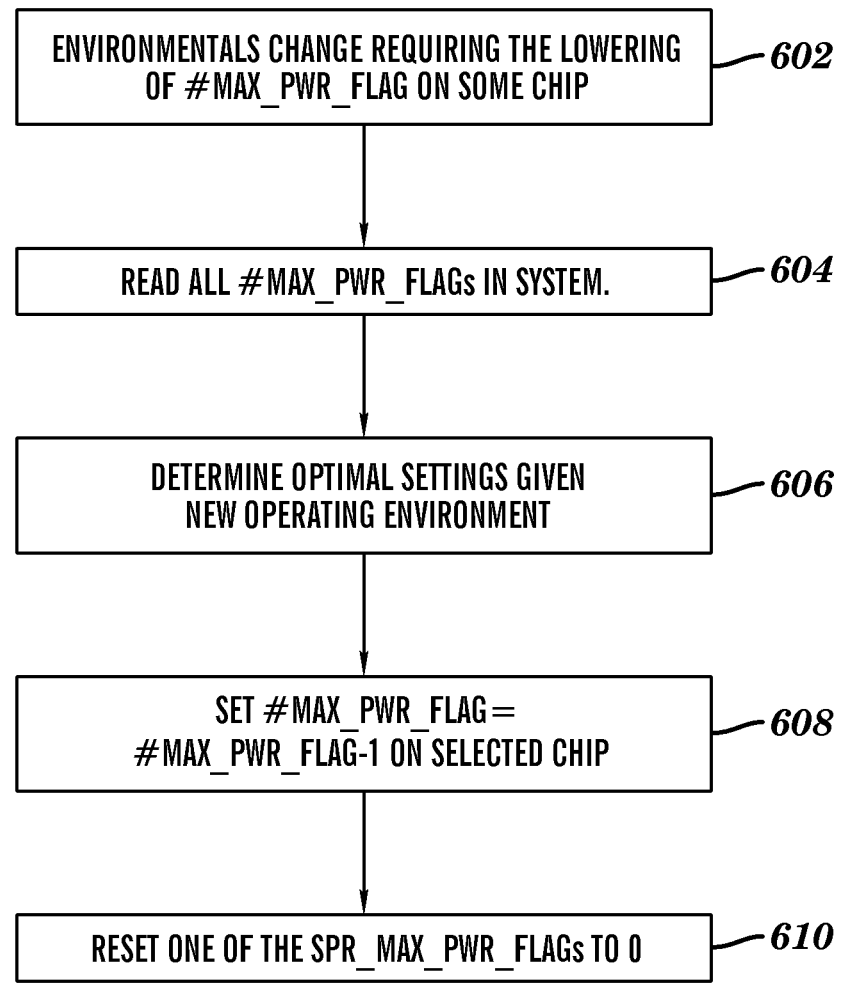
FIG. 6 depicts a process flow of a process to adjust the maximum power flags across the system in response to environmental changes.

FIG. 6 depicts additional detail of a process flow utilized by the system to adjust the #MAX_PWR_FLAGS 310 across all elements of the system in response to environmental changes. The process flow depicted in FIG. 6 may be executed by specialized hardware or periodic execution of code in the hypervisor, or by some other suitable system-level software.

At block 602, it is determined that the environmental conditions of the system have changed requiring an update to the #MAX_PWR_FLAGS 310 on some chip or chips within the system. At block 604, all of the #MAX_PWR_FLAGS 310 in the system are read. These flags are then analyzed in block 606 and new optimal settings are determined. In another exemplary embodiment, this summary information is stored in registers or in memory and may be periodically updated by any suitable combination of hardware and software. The new optimal settings include reducing #MAX_PWR_FLAGS 310 and setting the SPR_MAX_PWR_FLAG 306 equal to 0 for one of the processors; this is performed in blocks 608-610 of FIG. 6. In block 608, the #MAX_PWR_FLAGS 310 of the selected chip is reduced by 1. In block 610, one of the processors on the same chip with an SPR_MAX_PWR_FLAG=1 is reset so that SPR_MAX_PWR_FLAG=0.

In a further exemplary embodiment, more than two power states are supported. For example, there may be three different power states, a high, medium, and low power state.

Technical effects and benefits include the ability to manage power usage across multiple processors in a multi-processor system. This may lead to a decrease in power usage in a multi-processor system and/or in an increase in the amount of processing that can be performed by the multi-processor system while still remaining within a power usage threshold.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
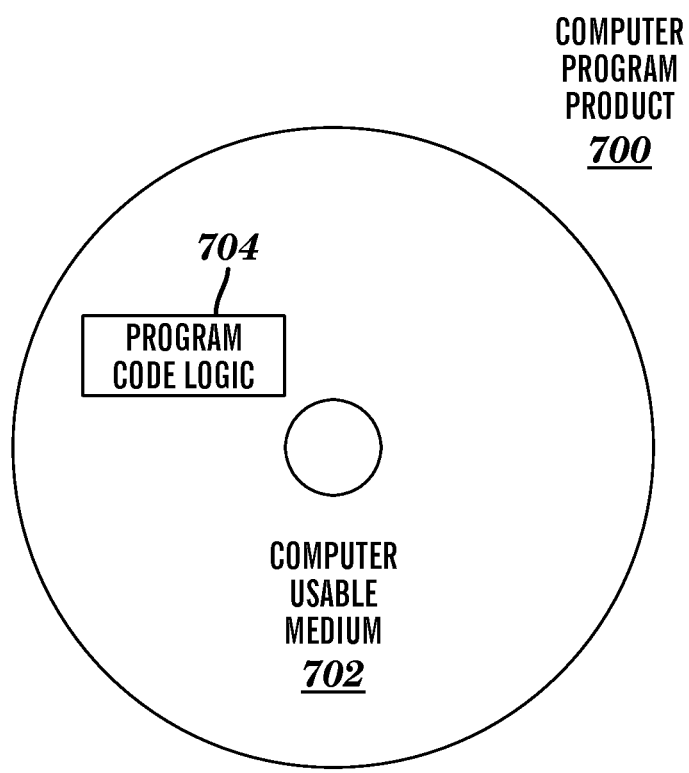
FIG. 7 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 700 as depicted in FIG. 7 on a computer usable medium 702 with computer program code logic 704 containing instructions embodied in tangible media as an article of manufacture. Exemplary articles of manufacture for computer usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer program product for dispatching a task in a computer system, the computer program product comprising: a non-transitory storage medium readable by a processing circuit and storing instructions for execution by the processing circuit for performing a method comprising: receiving a task for execution in a high power state; determining a current power state of a processor, the processor one of a plurality of processors in a multi-processor system, the multi-processor system having a specified power limit; dispatching the task to the processor based on determining that the current power state of the processor is the high power state; and based on determining that the current power state of the processor is not the high power state: determining if moving the processor into the high power state will cause the multi-processor system to exceed the specified power limit, the determining based on the specified power limit and to current power states of the plurality of processors in the multi-processor system; moving the processor into the high power state based on determining that moving the processor into the high power state will not cause the multi-processor system to exceed the specified power limit; and dispatching the task to the processor based on the moving the processor into the high power state.

2. The computer program product of claim 1, wherein the method further comprises transmitting an interrupt to an other processor based on determining that moving the processor into the high power state will cause the multi-processor system to exceed the specified power limit.

3. The computer program product of claim 2, wherein the method further comprises verifying that the other processor is executing in the high power state prior to transmitting the interrupt to the other processor.

4. The computer program product of claim 1, wherein the method further comprises dispatching an alternate task to the processor based on determining that moving the processor into the high power state will cause the multi-processor system to exceed the specified power limit, wherein the alternate task is a low power state task.

5. The computer program of claim 1, wherein the plurality of processors in the multi-processor system include two or more different power characteristics and not all of the plurality of processors have the capability of executing in the high power state, and the method further comprises verifying that the processor can support the high power state prior to determining if moving the processor into the high power state will cause the multi-processor system to exceed the specified power limit.

6. The computer program of claim 1, wherein the specified power limit is updated periodically based on current environmental conditions.

7. The computer program product of claim 1, wherein the current power state of each of the plurality or processors is collected on a periodic basis.

8. The computer program product of claim 1, wherein the method further comprises determining that the task should be executed in the high power state, the determining based on a current service level of the task and to a service level agreement associated with the task.

9. A system for dispatching a task in a computer system, the system comprising: a computer memory; and a processor in communication with the computer memory, the processor comprising an instruction fetching element for fetching instructions from memory and one or more execution elements for executing fetched instructions; wherein the computer system is configured to perform a method comprising: receiving a task for execution in a high power state; determining a current power state of a processor, the processor one of a plurality of processors in a multi-processor system, the multi-processor system having a specified power limit; dispatching the task to the processor based on determining that the current power state of the processor is the high power state; and based on determining that the current power state of the processor is not the high power state: determining if moving the processor into the high power state will cause the multi-processor system to exceed the specified power limit, the determining based on the specified power limit and to current power states of the plurality of processors in the multi-processor system; moving the processor into the high power state based on determining that moving the processor into the high power state will not cause the multi-processor system to exceed the specified power limit; and dispatching the task to the processor based on the moving the processor into the high power state.

10. The system of claim 9, further comprising a register located on the processor for storing an indicator of the current power state of the processor, and the determining a current power state of the processor comprises reading the register.

11. The system of claim 9, further comprising a register located on the multi-processor system for storing the specified power limit, the specified power limit indicating a maximum number of the processors on the multi-processor system that can be in the high power state at the same time.

12. The system of claim 9, further comprising a central power control located on the multi-processor system for moving the processor into the high power state and into a low power state.

13. The system of claim 9, wherein the method further comprises transmitting an interrupt to an other processor based on determining that moving the processor into the high power state will cause the multi-processor system to exceed the specified power limit.

14. The system of claim 9, wherein the plurality of processors in the multi-processor system include two or more different power characteristics and not all of the plurality of processors have the capability of executing in the high power state, and the method further comprises verifying that the processor can support the high power state prior to determining if moving the processor into the high power state will cause the multi-processor system to exceed the specified power limit.

15. The system of claim 9, wherein the specified power limit is updated periodically based on current environmental conditions.

16. A computer implemented method for dispatching a task in a computer system, the method comprising: receiving a task for execution in a high power state; determining a current power state of a processor, the processor one of a plurality of processors in a multi-processor system, the multi-processor system having a specified power limit; dispatching the task to the processor based on determining that the current power state of the processor is the high power state; and based on determining that the current power state of the processor is not the high power state: determining if moving the processor into the high power state will cause the multi-processor system to exceed the specified power limit, the determining based on the specified power limit and to current power states of each of the plurality of processors in the multi-processor system; moving the processor into the high power state based on determining that moving the processor into the high power state will not cause the multi-processor system to exceed the specified power limit; and dispatching the task to the processor based on the moving the processor into the high power state.

17. The method of claim 16, further comprising transmitting an interrupt to an other processor based on determining that moving the processor into the high power state will cause the multi-processor system to exceed the specified power limit.

18. The method of claim 16, further comprising dispatching an alternate task to the processor based on determining that moving the processor into the high power state will cause the multi-processor system to exceed the specified power limit, wherein the alternate task is a low power state task.

19. The method of claim 16, wherein the plurality of processors in the multi-processor system include two or more different power characteristics and not all of the plurality of processors have the capability of executing in the high power state, and the method further comprises verifying that the processor can support the high power state prior to determining if moving the processor into the high power state will cause the multi-processor system to exceed the specified power limit.

20. The method of claim 16, further comprising determining that the task should be executed in the high power state, the determining based on a current service level of the task and to a service level agreement associated with the task.

21. A computer program product for dispatching a task in a computer system, the computer program product comprising: a non-transitory storage medium readable by a processing circuit and storing instructions for execution by the processing circuit for performing a method comprising: receiving a task for execution in a low power state; determining a current power state of a processor, the processor one of a plurality of processors in a multi-processor system, the multi-processor system having a specified power limit; dispatching the task to the processor based on determining that the current power state of the processor is the low power state; and based on determining that the current power state of the processor is not the low power state: moving the processor into the low power state; and dispatching the task to the processor based on the moving the processor into the low power state.

22. The computer program product of claim 21, wherein the method further comprises determining that the task should be executed in the low power state, the determining based on a current service level of the task and to a service level agreement associated with the task.

23. The computer program product of claim 21, wherein the determining a current power state of the processor comprises reading a register that stores an indicator of the current power state of the processor.

24. The computer program product of claim 21, wherein the moving the processor into the low power state is performed by a central power control located on the multi-processor system.

25. The computer program product of claim 21, wherein the specified power limit is updated periodically based on current environmental conditions.

\* \* \* \* \*